United States Patent [19]

Milloy

[11] Patent Number: 4,664,026
[45] Date of Patent: May 12, 1987

[54] BARBEQUE COOKING AND SMOKING APPARATUS

[76] Inventor: Douglas F. Milloy, Lone Star Smoker, 9208 Rolling Rock La., Dallas, Tex. 75238

[21] Appl. No.: 794,295

[22] Filed: Nov. 1, 1985

[51] Int. Cl.⁴ ............................................. A47J 37/00
[52] U.S. Cl. ...................................... 99/352; 99/480; 99/482
[58] Field of Search ................. 99/352, 467, 468, 473, 99/474, 481, 480, 482, 475, 476, 340, 339, 483; 426/523

[56] References Cited

U.S. PATENT DOCUMENTS 3,491,678  1/1970  Oyler ...................................... 99/480
4,510,854  4/1985  Robertson .............................. 99/476

Primary Examiner—Billy J. Wilhite
Attorney, Agent, or Firm—Hubbard, Thurman, Turner & Tucker

[57] ABSTRACT

A barbeque cooking and smoking apparatus of the type having a separate oven and an adjacent firebox with a smoke passage opening between the firebox and oven for passage of smoke and heat from the firebox into the oven having a positive mechanical gate operated by the oven door which blocks the smoke passage opening when the oven door is open and opens the smoke passage opening when the oven door is closed.

9 Claims, 8 Drawing Figures

BARBEQUE COOKING AND SMOKING APPARATUS

BACKGROUND OF THE INVENTION

Field of the Invention

The present invention pertains to a cooking apparatus. It more particularly pertains to a barbeque cooking and smoking apparatus of the type having a separate firebox and oven chamber in which an operating mechanism automatically closes off the firebox from the oven chamber by a maintenance free mechanical linkage between the oven door and a gate.

In the barbequing cooking and smoking art there have been a number of variations in barbeque grills and smokers of very small size up to very large sizes that can handle in excess of a thousand pounds of meat at one time. At the other end of the scale is a unit designed to handle a single brisket. Devices have tended to be either very elaborate and complicated which makes them expensive to build and difficult to maintain or they tend to be rudimentarily simple with virtually no control features.

This invention encompasses an embodiment of a relatively small portable smoker cooker as well as a large commercial unit and features simple and economical construction with positive and maintenance free operation. Some critical needs are addressed by this invention which are not met by the prior art devices in any real way. This invention addresses the problems of operational convenience and safety in a device of this type.

Prior art devices of this type have some problems. Once a good hot fire is started and going in the firebox the smoke is continuously directed into a smoking chamber which holds meat to be cooked and smoked simultaneously. Naturally the oven has a door which is opened to remove or add food and to check on the progress of the operation. In order to open the door the operator has to stand relatively close to the hot smoke filled device and upon opening the door is met with a continuing blast of very hot acrid smoke filled gasses and particles which take the path of least resistance to escape through the open door. This situation is not only inconvenient but potentially dangerous and unhealthy as well. It provides the opportunity for sparks to work their way from the interior of the firebox through the open door of the oven which creates a fire hazard.

With the door of the oven open, the fire in the firebox is under very loose and incomplete control because the firebox is open into the oven which is wide open to the air. The fire can easily get out of control in this situation unless the lid is again quickly closed. Excess fuel is consumed and excess heat is generated making temperature control more difficult. The ashes can easily get drawn into the food in these circumstances.

This invention solves the problems referred to above by automatically inexpensively and reliably closing the opening between the firebox and the oven through a positive mechanical linkage which does not rely upon sources of electricity or other such outside influences in order to perform the above said function.

SUMMARY OF THE INVENTION

It is therefore a primary object of the invention to provide a barbeque oven comprising a separate oven and firebox abutted adjacently and with an opening therebetween, with a means for automatically sealing the opening between the firebox and the oven through a positive mechanical linkage which is simple, inexpensive and maintenance free. A gate automatically closes the opening when the door is open and opens the opening when the door is closed. This eliminates the undesirable passage of smoke and heat into the oven chamber and consequently into the vicinity of the operator during operation when the oven door is open.

Another object of the invention is to decrease the likelihood of sparks emanating from the firebox causing a fire because they are restrained from exiting the firebox when the oven door is opened.

Another object of the invention is to lessen the chance of ashes from the firebox being drawn into the oven or being blown into the oven by the action of the wind when the device is used outside.

One embodiment of the invention is a portable unit with a work table adjacent to the oven and having the oven and firebox mounted on a stand which can be mounted on wheels or it can be trailer mounted. A gate on the inside of the oven is pivoted at one end to swing up and uncover the smoke passage opening between the oven and the firebox through an operating mechanism connected to the lid.

Another embodiment involves a larger unit which stands at a convenient level and has a door which opens outwardly having hinges adjacent the abutting firebox. It has an essentially horizontal operating mechanism which opens and closes the opening between the firebox and the oven chamber positively and mechanically in response to the movement of the door to which the operating mechanism is attached.

Those skilled in the art will further appreciate the above mentioned features and advantages of the present invention as well as other superior aspects thereof upon reading the detailed description which follows in conjunction with the drawings.

DESCRIPTION OF THE PREFERRED EMBODIMENTS

Figure 1:
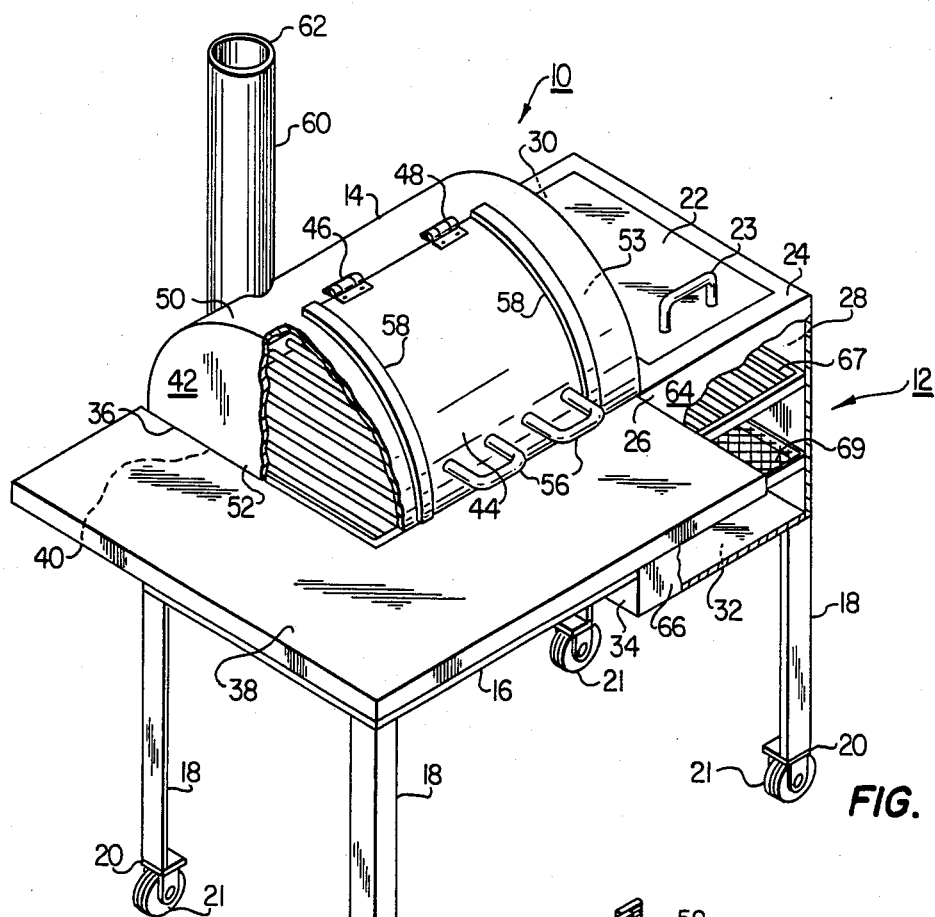
FIG. 1 is a perspective view of a barbeque unit of the present invention with the door closed.

In the description which follows like parts are marked throughout the specification and drawings with the same reference numerals, respectively. The drawings are not necessarily to scale and certain features of the invention may be exaggerated in scale or shown in schematic or diagramatic form in the interest of clarity or consciseness.

A portable barbeque unit generally described by the reference numeral 10 has a firebox 12 and an oven 14. The firebox 12 and the oven 14 are mounted on a frame 16 having legs 18. Casters or wheels 21 may be mounted at the lower end 20 of the legs 18 or the unit may be trailer mounted or stationed at a particular location.

The firebox 12 is of a boxlike shape which has a cover 22 mounted at the top which may rest on brackets or a ledge in the firebox (not shown) or it may be hinged to the firebox. In either event the cover can be opened or removed depending on which means is used to support it. The cover has a handle 23.

The boxlike firebox 12 has a surrounding wall which is made up of a top panel 24 non-abutting side panels 26, 28 and 30, a bottom panel 32 and an abutting side panel 34. While side panel 34 is identified as abutting it also has some non-abutting portions which are not actually in contact with the side of the oven.

The oven and firebox are arranged in a horizontal side by side relationship with the firebox being partially vertically offset from the oven 14. The oven 14 has a portion which is referred to as an upper portion which is defined roughly by a horizontal line at the work table surface shown at 36 which is formed by the meeting of the work table 38 with oven 14. A lower portion of the oven 40 is part of the oven which is roughly below the line 36 which is formed by the location on the oven with respect to the work table 38. The upper portion of the oven is identified as 42 and the lower portion is identified as 40. In other words the oven is divided roughly in half by the work table 38 and all of the oven above the work table is referred to as the upper portion 32 whereas that portion of the oven below the work table is defined as the lower portion 40. The oven also has a door 44 with hinge 46 and hinge 48.

The oven is mounted in a horizontal orientation having the form of a generally cylindrical surface 50 with a non-abutting endwall 52 and an abutting endwall 53 connected thereto to form a chamber inside the oven 14. The chamber is identified as 54 in FIG. 2. Handles 56 are fixed to the oven door to enable the operator to open and close the oven door 44. Door 44 is equipped with outside edge seals 58 on either side which serve to restrict the flow of smoke from getting out of the inside of the oven. Inside edge seals 59 are used to provide a convenient ledge to support the door when it is closed and further serve as an additional barrier to the escape of smoke or heat. The oven is equipped with a flue 60 which is connected into the interior chamber of the oven through the wall of the oven in order to provide exhaust of heat and smoke that comes into the oven from the firebox. The flue 60 has an end 62 to which may be connected a damper (not shown) which may be used to regulate the amount of flow through the flue 60 in order to control the temperature or the amount of heat and smoke passing therethrough. The oven has a grill 63 for holding food for cooking which extends across the oven chamber and is cut out or open as necessary to provide room for the operating mechanism.

Figure 2:
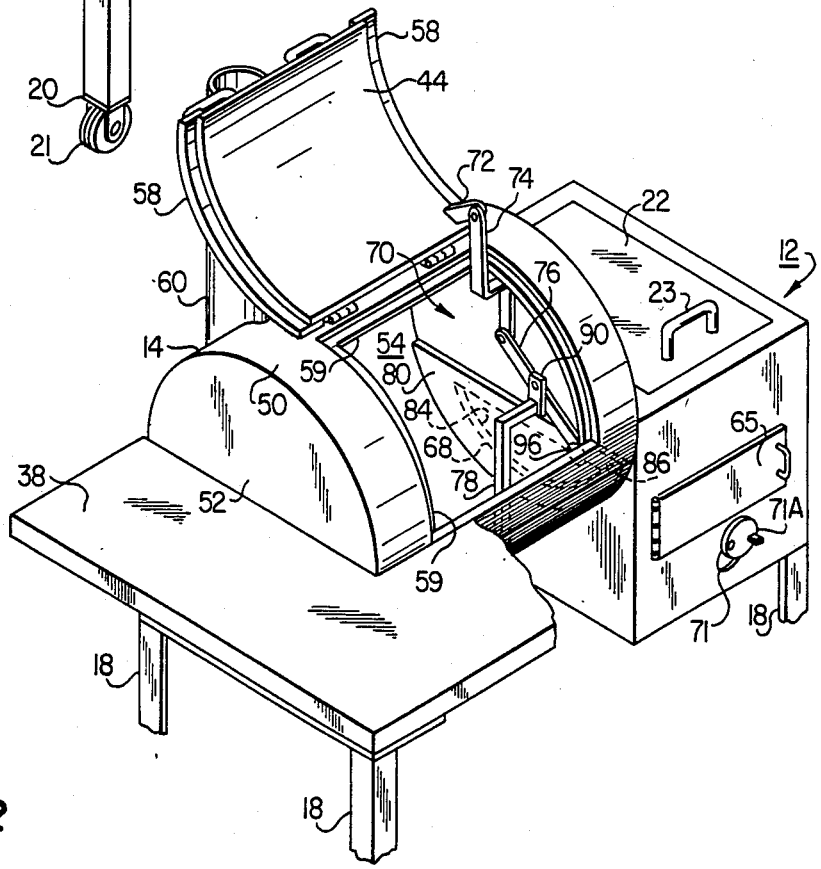
FIG. 2 is a perspective view of the barbeque unit of FIG. 1 with the oven door open.

Returning now to the firebox 12 of FIGS. 1 and 2 the firebox may be described as having an upper portion 64 and a lower portion 66. These are meant to describe roughly the entire top half and the entire bottom half respectively of the box like firebox.

A number of generally conventional features are included in the firebox which are not shown in the drawings. Spaced below cover 22 is a food supporting grill 67 across the firebox and spaced below the food supporting grill is a fire supporting grate 69 which are mounted in the enclosure under the cover which is defined by the walls of the firebox itself and may be mounted by suitable brackets or angle iron or be bolted in place. In one of the non-abutting walls, preferably wall 28, there is an opening with a door 65 that will close the opening (or several doors). The opening may be referred to as a fire access opening and the doors permit the operator to install logs, remove ashes and generally tend the fire on the grate 69 in the firebox. In addition an adjustable combustion air inlet 71 preferably in the lower portion 66 of the firebox wall must go into the enclosure in order to provide combustion air when the cover and the access doors are closed. This can be a simple opening with a sliding cover 71A that may be fastened with a wing nut in order to provide more or less area of opening according to the operators desire.

Finally the abutting wall 34 of the firebox 12 in its upper portion has a smoke passage opening which is aligned with a similar smoke passage opening in the abutting endwall 53 of oven 14 to comprise opening 84. These smoke passage openings are essentially coextensive and are referred to individually or collectively as smoke passage opening 84. If the oven and firebox share a common sidewall they will have a common opening 84. The smoke passage opening should preferably be located near the bottom of the oven because of the better heat and smoke distribution that occurs because of the fact that hot air rises. In order to reduce the possibility of a log or a portion of a piece of firewood getting into the smoke passage opening and physically interfering with the operation of the gate, it is preferable to have a piece of open mesh wire, expanded metal or the like in the firebox covering the opening but not otherwise interfering with the smoke passage through the opening.

It is preferable that the smoke passage opening in the abutting endwall 53 of oven 14 be located a small distance above the lower most portion of the oven wall defining the chamber to form a lip 68 seen in FIG. 2. It is also preferable that the oven 14 be tilted slightly off horizontal and have a grease drain (not shown) at the lower most surface of the oven through the oven wall and located away from the firebox, so that drippings from melting grease which fall in the bottom of the oven will tend to flow out by gravity through the grease drain and cannot easily back up into the firebox because of lip 68. This reduces the likelihood of a fire from burning grease which might otherwise result.

Referring now to FIG. 2, the barbeque unit 10 of FIG. 1 is seen with the door 44 in the open position revealing the operating mechanism 70 which includes a door connection member 72, a linking member 74, a pivot arm 76, a support member 78, and a gate 80. This is seen through the access opening 82 in the oven wall which is identified in FIG. 4.

Figure 4:
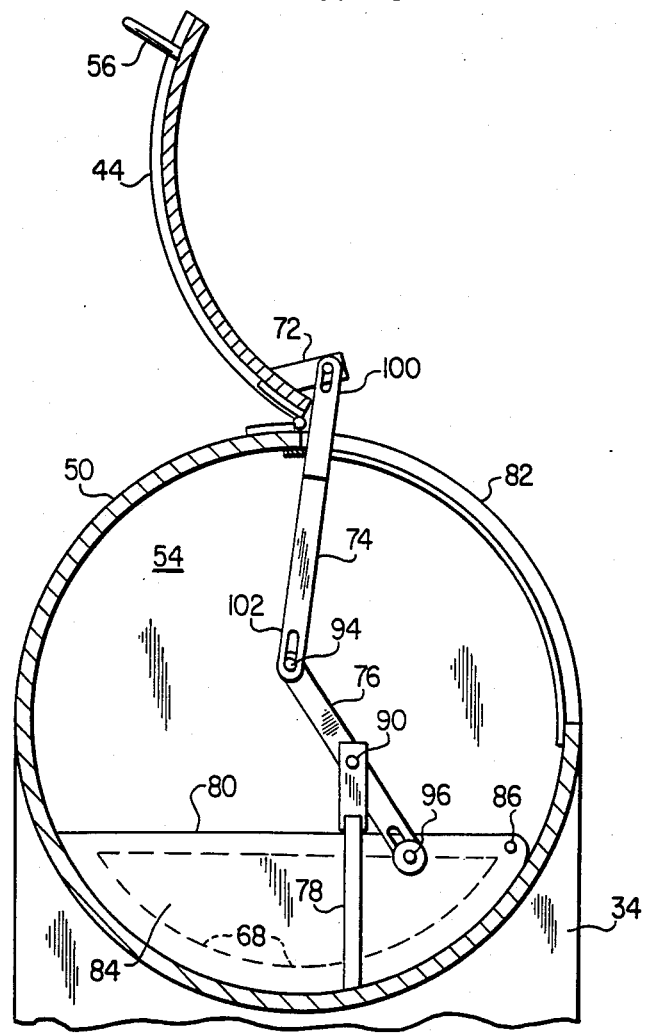
FIG. 4 is a sectional end view of the unit of FIG. 2 looking toward the firebox showing the position of the gate with the oven door open.

FIG. 4 is an end view of the operating mechanism components looking in cut away section towards the firebox 12. The cylindrical wall surface 50 encloses the chamber 54 with the door 44 in the open position the same as it was in FIG. 2. The smoke passage opening 84 is indicated by the dotted lines and it extends through the oven endwall 53 and through the abutting side panel 34 of firebox 12. The opening 84 in the abutting endwall 53 of the oven is cut to leave a lip 68. Gate 80 is shaped to fit comfortably in the oven chamber adjacent the abutting endwall 53. It is larger than the smoke passage opening 84 and shaped to cover the opening by overlapping around the edges. Abutting endwall 53 and abutting endwall 34 are generally vertical in orientation as is the gate 80.

Gate pivot fulcrum 86 near an end of the gate 80 connects the gate to the wall of the oven, more specifically to abutting wall 53. This connection could be a welded stud passing through an opening in the gate or it could be a bolt or stud which passes into the oven chamber all the way from the enclosure within and defined by the wall of the firebox. The gate pivot fulcrum 86 holds the gate in position next to the wall and allows the gate to pivot upwardly above the gate pivot fulcrum to the position in FIG. 3.

Support member 78 is rigidly fixed to the wall of the oven. It is preferably located some distance away from the abutting wall but is angled toward the abutting wall of the oven and terminates in a support pivot connection 90. It does not extend all the way to the abutting wall in order to leave room for the operating mechanism to move the gate up and down. A pivot arm 76 has a link connecting end 94 and a gate connecting end 96. The gate connecting end 96 is slotted and pivotally connected to an upper portion of the gate intermediate the gate pivot fulcrum 86 and a vertical line running through the support pivot connection 90. The pivot arm 76 is roughly centrally pivoted to the support pivot connection 90 between the link connecting end 94 and the gate connecting end 96. A linking member 74 with an upper end 100 having a slot has a lower end 102 also having a slot which is pivotally connected to link connecting end 94 of pivot arm 76. Linking member 74 is offset at its upper end away from the firebox and has a portion of its upper end which extends outside the wall of the oven through the access opening 82 in the oven wall, when the door is opened.

Door connection member 72 is rigidly fixed to the chamber side of the oven door 44 on the firebox side of the chamber and located just inside the edge of the oven access opening. It is angled outwardly and downwardly with respect to the inner surface of the door as is best seen in FIG. 4. This permits it to provide a short lever arm for linking member 74 but keeps the linking member far enough away from the upper portion of the access opening and the door so that it does not strike them and allows the door to be placed in a position where it will remain open by its own weight. The slotted upper end 100 of the linking member 74 aids in this by providing some free travel between the connecting member 72 and the upper end of the linking member 100. The pivoting connections such as those at 94, 102 allow the levers to freely rotate with respect to each other while remaining engaged with each other. Where there is a slot, the pivot point can move within the slot to the extremities of the slot, while pivoting.

Figure 3:
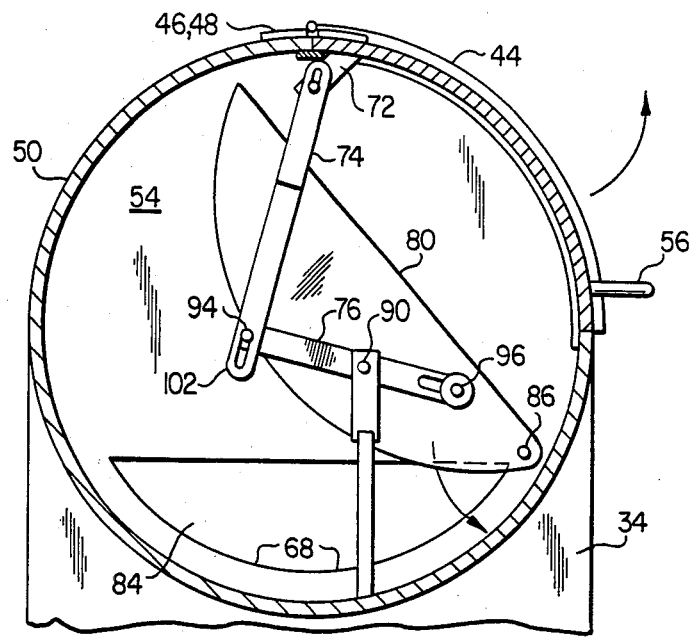
FIG. 3 is a sectional end view of the unit of FIG. 1 looking towards the firebox.

Referring now to FIG. 3 we see the position of the gate when the door 44 is closed which unblocks opening 84 so that hot gas and smoke from the firebox can enter the chamber through the smoke passage opening 84. Rotation of the door 44 from the position of FIG. 4 rotates the connecting member about a radius running from the hinges 46 and 48 downwardly into the oven chamber. Linking member 74 moves downwardly until its slotted lower end meets the resistance of the pivoting connection at the link connecting end of pivot arm 76. As pivot arm 76 begins to rotate about the fixedly positioned support pivot connection of support member 78, lifting force is supplied to the gate through gate connecting end 96 of the pivot arm which raises gate 80 upwardly about gate pivot fulcrum 86, until when the door 44 is closed, the gate is essentially raised out of the way to unblock the opening 84. The reverse process of opening the door locates the gate back to the position of FIG. 4 to block the opening 84 in a similar matter.

An alternative embodiment of the invention with a modified gate operating mechanism is shown in FIGS. 5-8. This represents a large "commercial" type unit with a modified gate operating mechanism. In this embodiment of the invention the firebox operates strictly as a firebox providing heat and smoke to the oven chamber.

Figure 5:
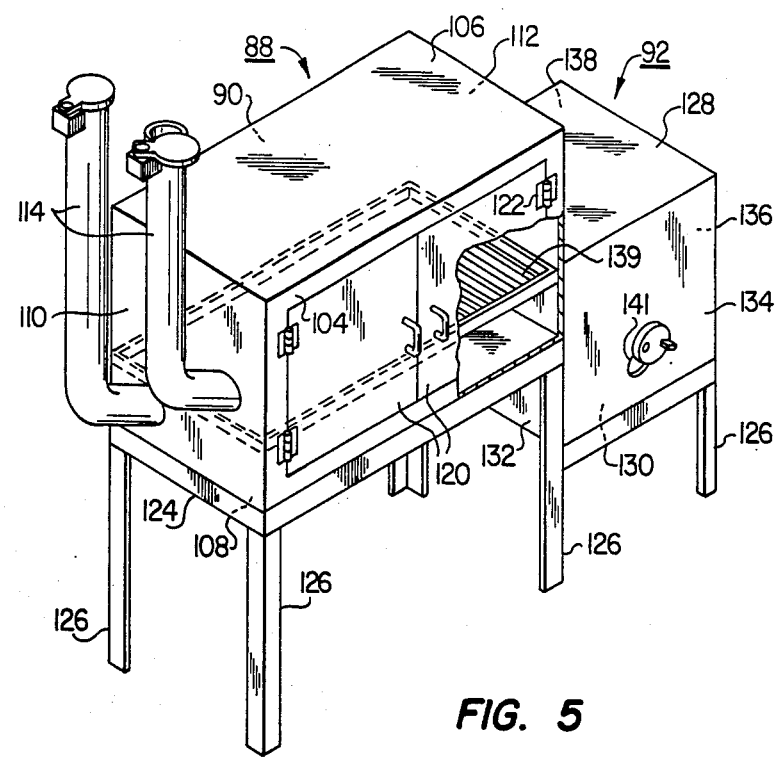
FIG. 5 is a different embodiment showing a large unit of the present invention in perspective.
Figure 8:
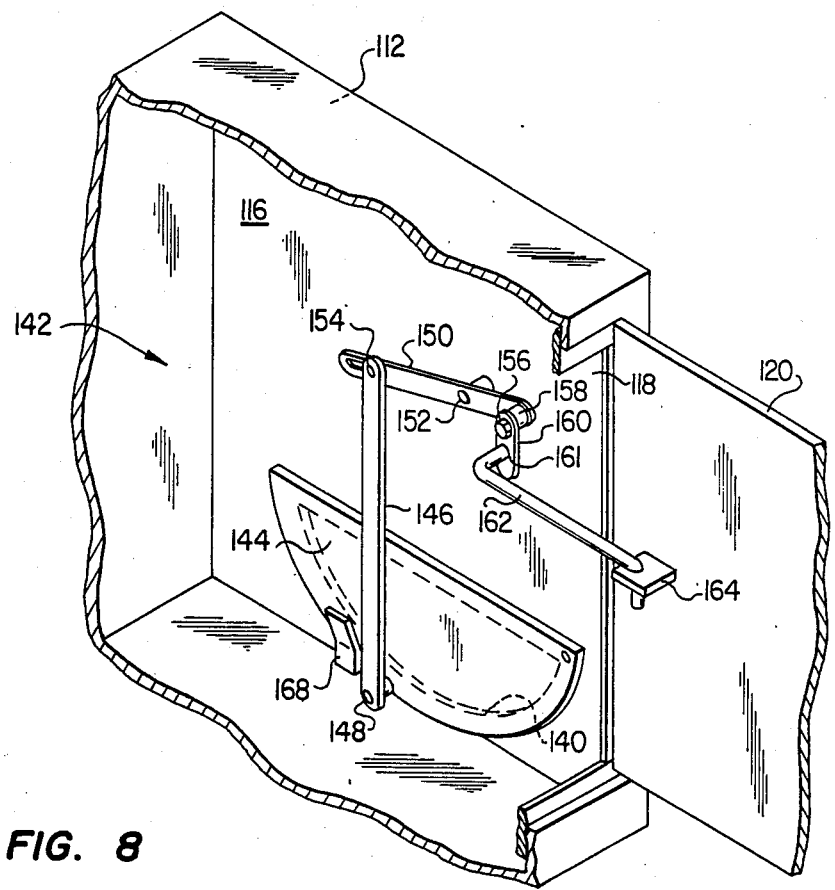
FIG. 8 is a perspective view of the operating mechanism of the oven of FIG. 5 with the door open and the gate closed. (The firebox is omitted).

In FIG. 5 a generally horizontal oven 88 and a firebox 92 are arranged in a generally horizontal side by side partially abutting relationship to each other. The oven has a back panel 98, a front panel 104, top panel 106, bottom panel 108, non-abutting end panel 110 and abutting end panel 112. One or more flues 114 are provided at the end opposite the firebox. Together the panels just referred to constitute the wall of the oven which defines a chamber inside the oven identified in FIG. 6 as 116. Access opening 118 in the front wall of the oven seen in FIG. 8, is closed by one or more doors 120. At least one of the doors has hinges 122 arranged adjacent abutting wall 112 to allow the door to open away from the center of the oven. The oven and firebox are supported in a vertically offset orientation in a frame 124 having legs 126 which rest on a floor.

The firebox has a top panel 128 a bottom panel 130 a partially abutting side panel 132 and three non-abutting side panels 134, 136 and 138. These may be referred to as front, end and back panels, respectively. The firebox and oven have matching smoke passage openings 140 in their wall to allow heat and smoke from the firebox to enter the oven. The aforesaid panels of the firebox constitute a wall forming an enclosure for holding a fire. The firebox has a number of conventional features including a fire supporting grate in the enclosure, an adjustable combustion air inlet 141 and an access opening in a non-abutting sidewall, preferably sidewall 136, with a door covering said opening which can be opened and closed. These must be sufficiently large to tend the fire. Once the fire is going of course, the door is closed so that the smoke and heat can enter the oven 88. The firebox in this embodiment has no cover in its top and is not used by itself as a grill.

Figure 7:
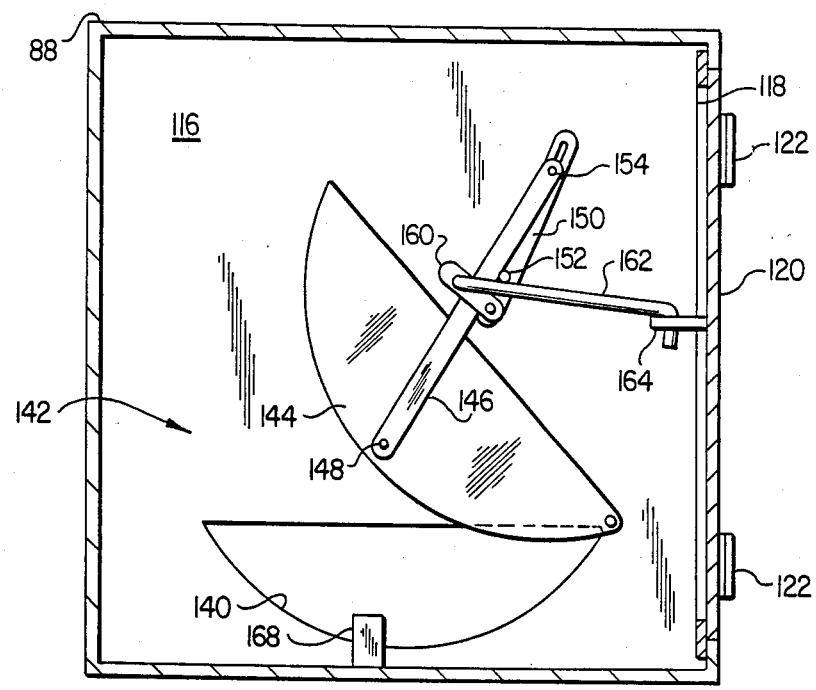
FIG. 7 is a sectional end view of the oven of FIG. 5 looking towards the firebox and showing the position of the gate mechanism with the door closed.

Referring now to FIG. 8 is the operating mechanism generally designated as 142. The smoke passage opening 140 is seen in FIG. 7 and is indicated by the dotted lines in FIG. 8. Gate 144 is shown in closed position blocking the smoke passage opening between the firebox and the oven chamber 116. The firebox itself is not shown in these views although it would be immediately adjacent the back side of the abutting end panel shown in FIG. 8. The gate is configured to overlap the smoke passage opening 140 and is conveniently shaped to allow it to unblock the opening through the operation of the operating mechanism 142.

The operating mechanism includes gate 144, lifting member 146, pivot arm 150, spacer 158, member 160, operating rod 162 and door connection member 164. A lifting member 146 is pivotally attached to the gate at pivot point 148 near its bottom. A pivot arm 150 is connected by pivoting connection 152 to the oven abutting wall 112. The long end of the pivot arm is slotted and has a pivotal connection 154 to the end of lifting member 146. A shorter end of pivot arm 150 has a rigid connection 156 to a member 160 with a spacer 158. Near the distal end of member 160 is a loosely attached shouldered operating rod 162 which is angled and leads outward where it is loosely but securely fastened to door connection member 164 which in turn is rigidly attached to door 120.

The shoulder 161 of operating rod 162 rests against a surface of member 160 with a reduced portion of operating rod 162 passing through an opening in member 160 as indicated in FIG. 8 and is pivotally attached thereto. The attachment is somewhat loose at that point both to allow a pivoting motion relative to member 160 and rod 162 but also because rod 162 is subject to some lateral movement caused by the closing of the door and the rotation of the door connection member 164 about a radius running from the hinges 122 to the pivot point where the operating rod 162 is pivoted to the door connection member 164. Thus when door 120 is closed the door connection member rotates both sidewardly and inwardly in order to operate the mechanism while allowing the door to close. Spacer 158 holds member 160 and operating rod 162 slightly further away from the firebox and away from pivot arm 150 so that there is less tendency for interference between the moving parts of operating mechanism 142 when the door is closed.

In order to go from the position shown in FIG. 8 to the position shown in FIG. 7, force applied to the door rotates the door connection member 164 and operating rod 162 slightly laterally and inwardly in a generally horizontal direction applying force to member 160 which is rigidly fixed by connection 156 to the shorter end of pivot arm 150. This results in a rotating moment about the pivoting connection 152 as the movement is continued. There may be a slight bending of the operating rod 162 because of the small amount of sideways movement that must occur which might not be entirely taken up by the loose connection between operating rod and member 160. The rotating moment provides a lifting force on lifting member 146 which in turn is pivoted to the gate at 148. This motion continues as the door is closed which raises gate 144 along the abutting sidewall 122 on the inside of the oven and gradually exposes more and more of the smoke passage opening 140 until finally the gate "snaps over center" with lifting member 146 resting against a portion of the spacer 158 when the door is closed. This action is aided by the slotted pivotal connection in the longer end of pivot arm 150. The gate itself is of course pivoted at its end by a gate pivot fulcrum 166.

Figure 6:
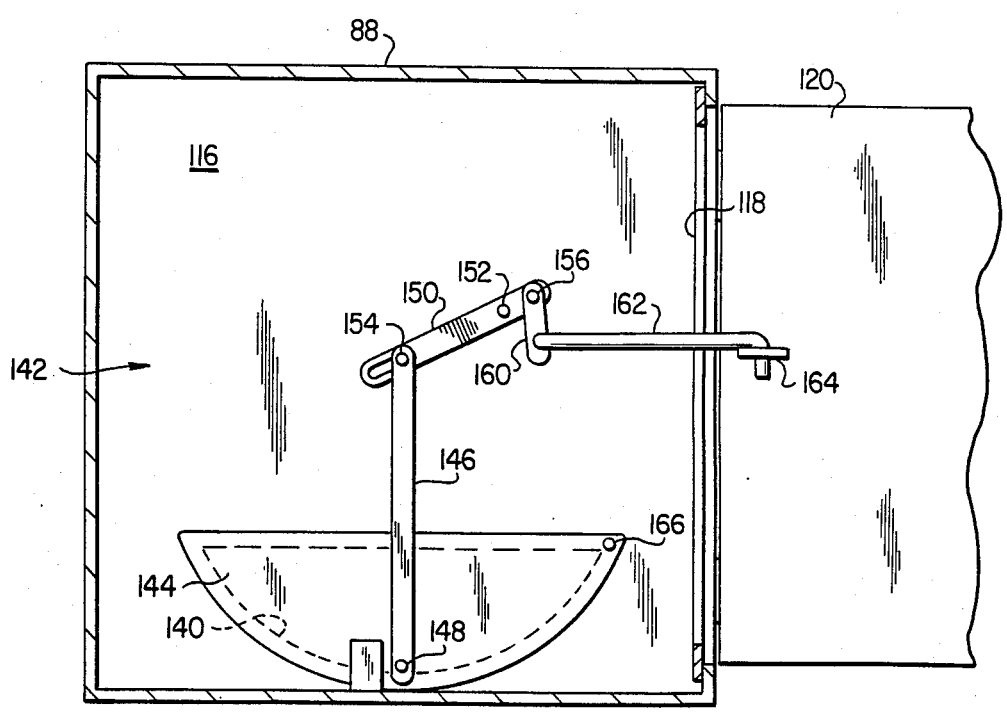
FIG. 6 is a sectional view of the oven of FIG. 5 looking towards the firebox, showing the gate in the closed position with the door open.

When the process is reversed by opening the door the gate is gradually lowered into a position which blocks the opening 140 and may be aided in this regard by a bracket 168 which is located near the bottom of the oven chamber in which is angled to catch the edge of descending gate 144 to force it against the inside wall of the oven and covering the opening 140. FIG. 6 shows a head on end view of the system just described with the door in the full open position. In the best mode it may be desirable to provide an additional strip or bracket member on the oven side of the portion of the oven wall which has the smoke passage opening but which does not interfere with the operating mechanism. It can prevent the gate from moving too far away from the wall with the opening.

In the operation of the device of FIGS. 5-8, which is the device just described, it should be recognized that a relatively large unit is contemplated. For example the firebox may be of approximately 30 inches in size with an 8 foot oven. The width of the oven is approximately the same as the width of the firebox. The oven will usually contain a plurality of food holding support racks, such as grill 139, for food in order to cook and smoke a large quantity of food at one time. The firebox is opened and a fire started on the grate in the enclosure therein which may be of charcoal or wood and usually involves the use of woods of the type that are normally used for smoking.

Once the fire is proceeding sufficiently and the food is loaded in the oven the firebox door is closed. With the oven doors closed as indicated in FIG. 5 the internal operating mechanism 142 will be in the position shown in FIG. 7. Smoke from the firebox readily enters the chamber of the oven and is allowed to exit through the flues 114. A damper in the flue or flues may be adjusted in order to control the amount of throughput of the hot air and smoke, and the combustion air inlet 141 in the firebox will be adjusted accordingly. In order to keep the fire going at the desired rate temperature gauges may be installed in the oven to allow the operator to adjust the conditions to achieve the desired effect. The whole unit is mounted in a frame at a convenient distance for the operator to load and unload food. The food may be staggered in preparation such as for restaurants where the food is to be consumed over a period of time.

When the oven is opened the operating mechanism 142 assumes the position shown in FIG. 6 and no further heat or smoke can enter the oven chamber and whatever remains is cleared up by passage through the exhaust stacks. At this point in the operation the operator is free to remove or add food and the fire does not burn out of control because the flow of combustion air has been curtailed by the gate which blocks the smoke passage opening. Eventually if the oven door were allowed to remain open, the fire would decline and eventually go out. In normal operation the door is not left open long enough for this to happen. But nevertheless any flying sparks which may be generated by the wide open draft that may occur when the oven doors are opened and which would tend to create a flaring up of the fire are prevented from escaping. The gate closes the opening and sparks are retained in the firebox enclosure and cannot escape.

It has been found that with a oven which is approximately 48" wide and 48" high and with a 42" door centered in the oven, the following rough part locations were satisfactory. The pivot point for the gate was about 12" from the floor of the oven and about 7" from the access opening with a lifting member about 24" high. The pivot arm had a short portion about 3" long and a long portion about 10" long with about an additional inch and a half slot in the long arm portion. The member 160 is about 3½" between pivot points and the pivot point 152 was spaced about 15¼" from the door opening. The operating rod 162 is about 16" long and it and the door connection member are located about 17¼" down from the top of the door and 3½" out from the edge of the door. With the door open the lifting member hangs down at a location about 23½" from the door opening. The spacer is about 1½" long. These dimensions are given as an approximate indication of what might work and some experimentation or adjustment may be necessary to get a particular operating mechanism functioning properly with this as a guide.

With respect to the embodiment shown in FIGS. 1-4 the mechanism which operates the gate is somewhat different than the one for the larger unit and there are some other differences as well. In this embodiment the firebox itself may be used as a grill by opening the cover 22 if it is hinged or removing if it is simply placed on brackets or a ridge or otherwise loosely supported. The firebox contains a food holding grill and is perfectly capable of grilling food without using the oven at all. In order to provide better draft in the firebox it might be desirable to have the operating mechanism closed so that the firebox is isolated.

If the oven is to be used for cooling and smoking then the cover 22 should be put in place so that smoke and heat generated by the firebox is directed through the smoke passage opening into the oven chamber with the door closed. The operation of the mechanism itself has been adequately described. The access opening is preferably provided as is shown in FIG. 2 with the door 44 hinged to the top of the cylindrical oven to provide a substantially vertically operating linkage for the gate 80. The size of the access opening is not critical as long as the operator can efficiently use it to cook. A greater or lesser angled section will be necessary in the linking member 74 depending on the relative size of the oven and the access opening and door. The angled linking member provides for clearance so that the lifting action can be located roughly vertically above the area where the gate is located while missing the side of the oven. Naturally the weight of the door is a consideration and is reduced by making the door and the corresponding access opening somewhat smaller. Note that to some extent the lowering of the gate during the opening of the oven door serves to counterbalance the door and make it easier to open. This is because the gate falls directly downward under its own weight and adds some upward force to the linkage that is connected to the door during a substantial part of its travel.

It has been found desirable to use studded pivot connections rather than bolts where parts of the mechanism move relative to the gate. This minimizes the problem of interference.

In the smaller residential unit with a firebox which is about 20" square and a oven having a diameter of about 20" with the type of gate construction shown in the figures, some rough dimensions are given. The door connection member angles out about $3\frac{3}{4}$" from the side chamber surface of the door and with the door in the open position the pivotal connection thereto is about 2" above the outside of the oven chamber. The linking member is about $11\frac{1}{2}$" between pivot points and has about $33\mu$" offset in it with the upper portion being about $2\frac{1}{2}$" long above the offset portion. The pivot arm has about a $1\frac{1}{2}$" slotted area with approximately 4" extensions from the center pivot point to the center of the slot at one end and to the center of the pivot at the other end. The main pivot point for the pivot arm is located about 8" vertically and $8\frac{3}{4}$" horizontally from the inside of the chamber. The gate is pivoted near its end about $1\frac{1}{2}$" from the inside of the chamber and the pivot arm connection to the gate is about $4\frac{1}{4}$" laterally from the inside of the chamber.

With the door in a closed position the free end of the pivot arm is about $10\frac{1}{4}$" vertically from the top inside of the oven and about $7\frac{1}{4}$" from the other inside wall with the pivotal connection at the other end being about 13" vertically from the inside of the chamber and about 4" laterally from the inside of the oven. At least a 1" high lip should be provided at the bottom of the oven to where the smoke passage opening begins.

In the operation of this device in the smoking mode, once the fire is sufficiently proceeding in the firebox the food is loaded on the food support grill which is arranged to miss the operating mechanism and is located at approximately the level of the table in FIG. 2 or slightly higher. The door is closed and smoking can begin with appropriate adjustments to the exhaust stack flow and the combustion air flow into the firebox. When the door is raised, as before, the gate descends and closes off the opening between the firebox and the oven preventing smoke or sparks from entering the oven chamber. A further safety feature is offered in that if a operator opens the door and moves the food to a serving place in a forgetful manner the fire will not go out of control and will be confined in the firebox where it will eventually go out. Contrast this with a device of this type not having a closure for the opening between the firebox and the oven whereby the fire would be expected to accelerate and perhaps create flying sparks which could start a fire in the vicinity, especially if the unit is used outdoors. The units are constructed of any suitable heavy gauge metal including $\frac{1}{4}$" plate.

Although preferred embodiments of the present invention have been described in detail here, those skilled in the art will recognize that various substitutions and modifications may be made to the specific embodiments disclosed without departing from the scope and spirit of the invention as described in the appended claims.

What I claim is:

1. A barbeque cooking and smoking in operable combination comprising:
    a portable frame supporting an oven and a partially vertically offset abutting firebox in a side by side relationship, the oven having an upper portion raised higher than the firebox and a lower portion coextensive with an upper portion of the firebox;
    the firebox having at least an openable cover in its upper portion with a food supporting grill spaced below said cover in the firebox, and an openable door in a non-abutting side, located for access to a fire holding space below said grill and of sufficient size to admit fuel for a barbequing fire, said firebox also having an adjustable inlet for combustion air;
    said oven having at least an openable door in said upper portion, a food supporting grill intermediate said upper and said lower portion, and a means for exhausting gasses and smoke from the oven;
    a means for passage of smoke from the firebox to the oven through abutting sides of the firebox and the oven;
    means responsive to the movement of the oven door for closing off said means for passage of smoke when said door is opened, and opening said means for passage of smoke when said door is closed.

2. The apparatus of claim 1 wherein the means for passage of smoke is a smoke passage opening and the means responsive to said oven door further comprises;
    a door connection member fixed to said oven door at a location nearest the firebox,
    a linking member pivotally connected to the door connection member and extending into the chamber;
    a pivot arm mounted inside the chamber by a pivoting support connection to a support member, said pivot arm having portions extending on either side of said pivot connection;

a gate adapted to cover the smoke passage opening, said gate having a gate pivot fulcrum near one end fastened in the wall of the oven which has the smoke passage opening, which allows the gate to swing up sufficiently to uncover said opening;

a pivot connection of the pivot arm to the gate intermediate the gate pivot fulcrum and the location of the pivot arm support, which transmits force through the linkage to raise the gate when the oven door is closed and lower the gate when said door is opened to block or unblock the smoke passage opening.

3. The apparatus of claim 1 where the means for passage of smoke is a smoke passage opening, further comprising an operating mechanism for the means responsive to the oven door including:

a gate adapted to cover or uncover the smoke passage opening inside the oven said gate having a gate pivot fulcrum end and an opposite other end and being pivoted at said fulcrum end by a pivot fulcrum near the wall of the oven and adjacent the wall with the smoke passage opening;

a support member in the chamber, angled to a support position for the gate operating mechanism;

a pivot arm centrally pivoted to the support member by a support pivot connection and having a gate connecting end pivotally connected to said gate intermediate the gate fulcrum pivot and the location of the support pivot connection, said pivot arm having a linkage connecting end;

a linking member having a lower end pivotally connected to the linkage connecting end of the pivot arm and having an upper end, and;

a door connection member extending from the chamber side of the oven door and being pivotally connected to the upper end of said linking member, said operating mechanism mechanically linking the oven door to the gate for positive raising up of the gate about the gate fulcrum pivot while the oven door is being closed and having the opposite effect while the door is being opened, to block or unblock the smoke passage opening by operation of the door.

4. A barbeque cooking and smoking apparatus in operable combination comprising:

a horizontally oriented cylindrically shaped oven and a box shaped adjacent firebox sharing at least in part a common sidewall having a smoke passage opening in a lower portion thereof;

said oven having a surrounding wall including the common sidewall defining a chamber and having an access opening and access door covering said access opening, an exhaust opening from the chamber connected to a flue which is located near the end of the chamber opposite from the common sidewall and at least one food supporting grill across the chamber and accessible from said access opening;

said firebox also having a surrounding wall including the common sidewall which defines an enclosure with an access opening and an openable cover over the access opening which are located in a top portion of the firebox wall, a food supporting grill across the enclosure spaced below the cover, a fire supporting grate in the enclosure spaced below the food supporting grill, an openable fire access door located in a side portion of the firebox wall for tending a fire therein, said firebox also having an adjustable combustion air inlet so that a fire in the firebox can be used for grilling in the firebox enclosure with the cover open or as a source of heat and smoke to the oven through the smoke passage opening with the cover closed; and means responsive to movement of the oven door for blocking off said smoke passage opening when said door is opened, and for unblocking said smoke passage opening when said door is closed.

5. The apparatus of claim 4 further comprising an operating mechanism for the means responsive to the oven door including:

a gate adapted to cover or uncover the smoke passage opening inside the oven said gate having a gate pivot fulcrum end and an opposite other end and being pivoted at said fulcrum end by a pivot fulcrum near the wall of the oven and adjacent the wall with the smoke passage opening;

a support member in the chamber, angled to a support position for the gate operating mechanism;

a pivot arm centrally pivoted to the support member by a support pivot connection and having a gate connecting end pivotally connected to said gate intermediate the gate fulcrum pivot and the location of the support pivot connection, said pivot arm having a linkage connecting end;

a linking member having a lower end pivotally connected to the linkage connecting end of the pivot arm and having an upper end, and;

a door connection member extending from the chamber side of the oven door and being pivotally connected to the upper end of said linking member, said operating mechanism mechanically linking the oven door to the gate for positive raising up of the gate about the gate fulcrum pivot while the oven door is being closed and having the opposite effect while the door is being opened, to block or unblock the smoke passage opening by operation of the door.

6. The apparatus of claim 4 wherein the means responsive to said oven door further comprises;

a door connection member fixed to said oven door at a location nearest the firebox, a linking member pivotally connected to the door connection member and extending into the chamber;

a pivot arm mounted inside the chamber by a pivoting support connection to a support member, said pivot arm having portions extending on either side of said pivot connection;

a gate adapted to cover the smoke passage opening, said gate being having a gate pivot fulcrum near one end fastened in the wall of the oven which has the smoke passage opening, which allows the gate to swing up sufficiently to uncover said opening;

a pivot connection of the pivot arm to the gate intermediate the gate pivot fulcrum and the location of the pivot arm support, which transmits force through the linkage to raise the gate when the oven door is closed and lower the gate when said door is opened to block or unblock the smoke passage opening.

7. A barbeque cooking and smoking apparatus in operable combination comprising:

a generally horizontal oven supported by support means a convenient height above a floor, said oven having front and back panels, top and bottom panels and end panels forming an interior chamber having at least one food supporting grill across said chamber;

said oven further including an exhaust flue and at least one access door in its front panel which is hinged adjacent one of the end panels for opening outwardly, said one end panel having a smoke passage opening located near its bottom most portion;

a firebox at least partially abutting said one end panel of the oven, said firebox being supported above the floor by support means, said firebox having a top and bottom panel, an at least partially abutting side panel and three non-abutting side panels forming an enclosure for a fire, said firebox being generally aligned with the oven in a horizontal direction, said abutting panel having a smoke passage opening aligned with the smoke passage opening of said one oven end panel;

said firebox also having means for supporting a fire in the enclosure, means for access to the fire supporting means located in a non-abutting panel, which means can be closed, and means for adjustably admitting combustion air to a fire in the enclosure; and means in the oven responsive to the movement of the oven access door which closes the smoke passage opening when said door is opened and opens said smoke passage opening when said door is closed.

8. The apparatus of claim 7 wherein the means responsive to said oven door is an operating mechanism comprising:

a gate in the oven adjacent the smoke passage opening, said gate being adapted to cover the smoke passage opening in one position and uncover the smoke passage opening in another position, said gate being pivotally connected at one end to the oven wall;

a lifting member pivotally connected to the gate intermediate said gate pivotal connection and the opposite end of said gate;

a pivot arm inside the oven pivotally mounted above the gate to the oven wall having the smoke passage opening, said arm having a longer portion extending on one side of said pivotal mounting and a shorter portion extending on the other side of said pivotal mounting, said longer portion being pivotally connected to the lifting member at the end of the lifting member opposite its gate connection;

a member fixed to the end of the shorter portion of said pivot arm, having an end extending therefrom a distance sufficient to generate a gate lifting turning moment in the pivot arm when it is subjected to a force generated by the oven access door;

an operating rod pivoted loosely to the extended end of the member and having its opposite end extending toward the door and beyond the access opening when the door is open;

a door connection member fixed on the chamber side of the door near the hinges, having said opposite end of the operating rod pivoted to it, being located on the door in a position that allows the gate to block the smoke passage opening when the door is open and substantially unblock the opening when the door is closed, by transmission of force from the door to the gate through the operating mechanism.

9. The apparatus of claim 7 wherein the firebox and oven are constructed at least in part with a common wall between them, said wall having the smoke passage opening.

* * * * *